United States Patent [19]  [11] Patent Number: 5,442,689
Buttitta et al.  [45] Date of Patent: Aug. 15, 1995

[54] APPARATUS AND METHOD FOR PROVIDING SERVICES PRIOR TO CALL COMPLETION IN A TELECOMMUNCATION SYSTEM

[75] Inventors: Anthony Buttitta, Chicago; Eric A. Duesing, Downers Grove; Wayne R. Kalbow, Glen Ellyn, all of Ill.; Mark O. Rosstedt, Toms River, N.J.; Liane T. Tsai, Glen Ellyn, Ill.

[73] Assignee: AT&T Corp., Murray Hill, N.J.

[21] Appl. No.: 10,950

[22] Filed: Jan. 29, 1993

[51] Int. Cl.6 ............................................. H04M 3/42
[52] U.S. Cl. ................... 379/201; 379/211; 379/221; 379/243; 379/244
[58] Field of Search ............... 379/207, 221, 243, 244, 379/245, 201, 210, 211, 264, 120, 219, 212, 213, 269, 227, 120, 142

[56] References Cited

U.S. PATENT DOCUMENTS

| | | | |
|---|---|---|---|
| 4,277,649 | 7/1981 | Sheinbein | 379/201 |
| 4,310,727 | 1/1982 | Lawser | 379/207 |
| 4,656,658 | 4/1987 | King | 379/243 |
| 4,794,642 | 12/1988 | Arbabzadah et al. | 379/200 |
| 4,893,336 | 1/1990 | Wuthnow | 379/210 |
| 5,018,194 | 5/1991 | Suzuki et al. | 379/211 |
| 5,023,868 | 6/1991 | Davidson et al. | 370/62 |
| 5,109,408 | 4/1992 | Greenspan et al. | 379/197 |
| 5,237,604 | 8/1993 | Ryan | 379/211 |
| 5,278,897 | 1/1994 | Mowery et al. | 379/207 |
| 5,289,528 | 2/1994 | Ueno et al. | 379/211 |
| 5,311,572 | 5/1994 | Friedes et al. | 379/211 |
| 5,329,578 | 7/1994 | Brennan | 379/211 |

Primary Examiner—James L. Dwyer
Assistant Examiner—Scott L. Weaver
Attorney, Agent, or Firm—Charles L. Warren

[57] ABSTRACT

In a method implemented by a telecommunications switch, a call request is made for a called party having a predetermined directory number. A determination is made if preconnection services are to be provided for the called party, and if such services are to be provided, a service node to provide the services is identified. A further determination is made if the call request is from other than the selected service node. If the call request is not from the selected service node, the call request is routed to the service node for preconnection services. If a call request is from the selected service node, the call is routed to the called party. This permits a selected service node to originate a separate call to the called party so that services can be provided on behalf of the called party in response to a call request made by a calling party. This method allows preconnection services to be provided without the requirement of multiple directory numbers being assigned to the called party.

18 Claims, 2 Drawing Sheets

APPARATUS AND METHOD FOR PROVIDING SERVICES PRIOR TO CALL COMPLETION IN A TELECOMMUNCATION SYSTEM

BACKGROUND OF THE INVENTION

This invention is generally directed to services provided to subscribers in a telecommunication system and is more specifically directed to services provided to a called party subscriber prior to the establishment of communications with the calling party.

Modern telecommunication systems are capable of providing a variety of services for subscribers. Such services can be segregated into services provided prior to call completion and services provided after call completion. Services can be further characterized based upon whether the service is rendered on behalf of the calling or called party. The primary focus of this invention addresses services provided prior to call completion on behalf of the called party.

Depending on the nature of the service to be provided, services can be provided by customer premises equipment such as a telephone instrument, a central office switch, or a computer controlled peripheral device (service node) coupled to the telecommunication network. Subscriber services which are rendered on behalf of the called party prior to the completion of a calling party's call to the called party must be provided by the telecommunication system. Called party features, such as "Selective Call Acceptance", may require the assignment of multiple directory numbers to the called party's line. For the Selective Call Acceptance feature, the central office switch of the called party routes the incoming call request to a service node such as a service circuit node (SCN). The SCN compares the calling party's directory number to a list of directory numbers previously selected by the called party. The call is accepted and routed to the called party only if a match is found. If a match is not found, the calling party is not connected to the called party; the treatment of a nonaccepted call is defined by the telecommunication system, e.g. a prerecorded message could be played to the calling party or the calling party's call could be routed to an answering device. Such preconnection services typically utilize architectures containing a service node for providing such services in cooperation with a central office switch.

In order to provide preconnection services, it may be required to assign the called party two directory numbers. Calls to a published directory number of the subscriber are forwarded to an SCN for possible preconnection call processing; calls to an unpublished directory number known to the SCN are allowed to terminate at the called party's line. For the preconnection services, the central office switch associated with the called party forwards the initial call made to the published directory number to the SCN for processing. The service circuit node, after providing the desired service on behalf of the called party, originates a call to the called party using the unpublished directory number. Upon the called party answering the call placed by the SCN, the service function which may require interaction with the called party is completed while the call request by the original calling party is held in abeyance. Connection of the calling party to the called party may or may not occur depending on the outcome of the service provided and possible interaction between the called party and the SCN. With only a single directory number, all calls made to the subscriber including calls made by the SCN would be forwarded to the SCN. Thus, an undesirable recursive loop between the SCN and the subscriber could occur.

Although the use of multiple directory numbers for a single subscriber permits called party services, assigning multiple directory numbers rapidly depletes the total number of available directory numbers. In locations where a large demand for directory numbers exists, such as in large metropolitan areas, assigning multiple directory numbers depletes a valuable central office switch resource. Thus, there exists a need for techniques that can provide preconnection called party services without requiring the assignment of multiple directory numbers to each subscriber.

SUMMARY OF THE INVENTION

It is an object of the present invention to provide a method and apparatus which permits preconnection called party services to be rendered without incurring a recursive loop between the service node and a subscriber, or assigning multiple directory numbers to a subscriber.

It is also an object of the present invention to provide a method and apparatus which permits a switch to selectively utilize other network elements to provide services prior to call termination.

In accordance with an embodiment of a method in accordance with the present invention, preconnection services are provided in a telecommunication system including an SCN and a central office switch to which the called party is connected. A call request is received from a calling party by the switch for a called party having a predetermined directory number. A determination is made by the switch if preconnection services involving an SCN are to be provided for the call request. If such services are to be provided, an SCN is identified to assist in providing the services. The call is then forwarded to the SCN and the SCN then originates a call request to the original called party's number. A determination is made by the switch whether the call request is from the identified SCN. If the call request is not from the identified SCN, the call request is redirected to the identified SCN for the providing of preconnection services. If a call request is from the SCN that provides services for the called party, the call request is routed by the switch to the called party having the predetermined directory number. This allows the call request from the originating calling party to be held in abeyance at the SCN while the SCN provides services for the called party. The SCN concludes the service, and finally allows the held call request from the calling party to be completed to the called party, depending on the outcome of the service action. This method facilitates preconnection services where the SCN and the calling party utilize the same directory number for a called party.

BRIEF DESCRIPTION OF THE DRAWING'S

DETAILED DESCRIPTION

Figure 1:
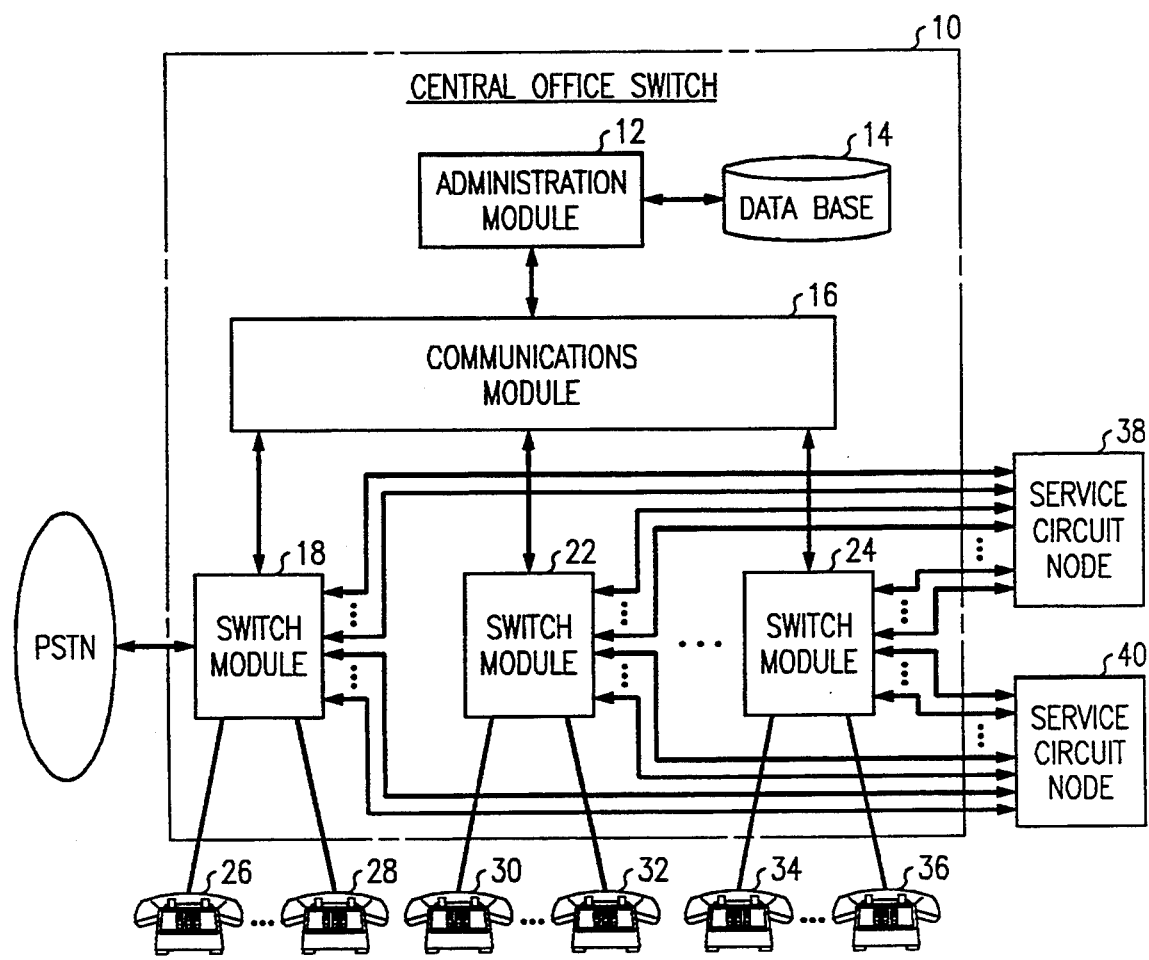
FIG. 1 is a block diagram of a telecommunication network including an embodiment of a central office in accordance with an embodiment of the present invention.

FIG. 1 illustrates a portion of a telecommunications network which includes a central office switch 10 which incorporates an embodiment of the present invention. The switch 10 may comprise an electronic telecommunication switch such as an AT&T 5ESS ® switch. The switch 10 includes an administration module 12 which provides central processor control and system functionality for the switch. Administration module 12 obtains operating system data and other operational data from database 14. Communication module 16 provides a space switch functionality that connects time switched (multiplexed) channels created by switch modules 18, 22, and 24. The communication modules and switch modules provide the known time-space-time switch format.

A plurality of customer premises equipment (CPE) such as telephone instruments 26, 28, 30, 32, 34, and 36 are connected by respective communication lines to the switch modules. In the illustrative example, service circuit nodes (SCN) 38 and 40 are coupled by communication channels to the switch modules. Service circuit nodes, such as available from AT&T, are programmable network nodes that allow a public switched telephone network (PSTN) provider to create new circuit related services and features. These nodes comprise an intelligent computer controlled peripheral which provide defined services in cooperation with central office switch 10 as shown in the illustrative example. The SCN's can be directly connected to the switch by communication channels or can be coupled to the switch by the PSTN.

Figure 2:
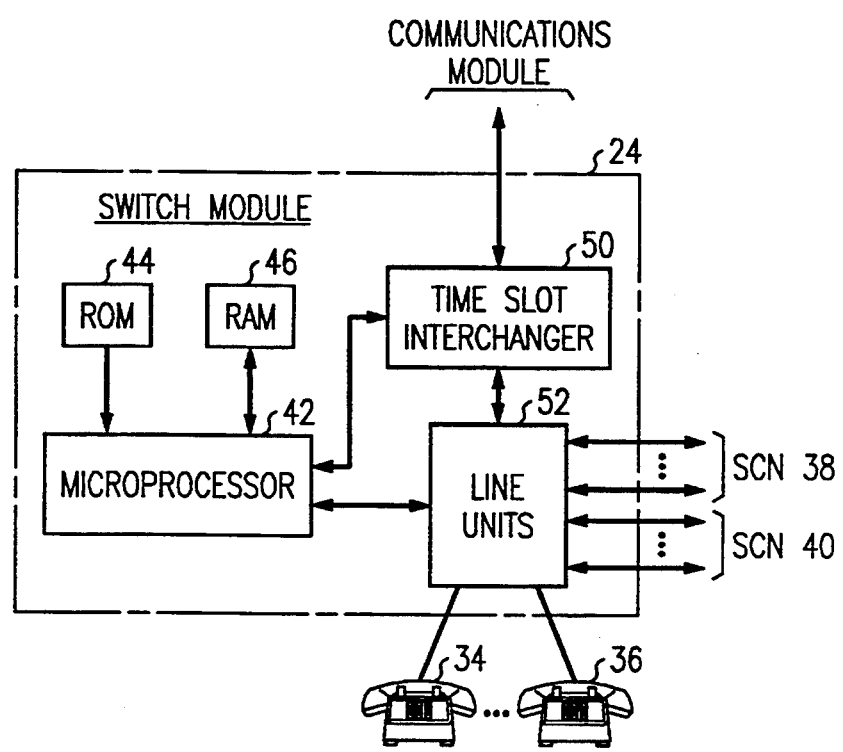
FIG. 2 is a block diagram of a switch module as shown in FIG. 1.

FIG. 2 is a block diagram of switch module 24 as shown in FIG. 1 and is representative of each switch module. The switch module includes a microprocessor 42 which operates in conjunction with read-only memory (ROM) 44, random access memory (RAM) 46. The ROM 44 stores operating system data and programs. RAM 46 provides accessible memory storage which can be rapidly read from and written to by the microprocessor. Database 14 provides a nonvolatile data storage medium for the microprocessor 42.

A time slot interchanger 50 and line units 52 operate under the control of the administration module 12, communication module 16, and microprocessor 42 to provide subscriber communications for illustrated CPE 34 and 36. The line units 52 provide an interface for the analog or digital communication lines coupling CPE 34 and 36 to switch module 24 and lines which couple the service circuit nodes 38 and 40 to the switch module. The communication signals from CPE and the SCN are coupled to time slot interchanger 50. There they are multiplexed into time slot segments that carry digital information which are forwarded to communication module 16 and linked to other time slots corresponding to another subscriber to establish communications between two subscribers. The transmission of communications by time division multiplex channels and the linking of such channels is well known in the art.

Table 1 illustrates an exemplary database for a switch module. Preferably, the database is stored in memory associated with each switch module for the respective lines supported by the switch module.

TABLE 1

| Port No. | Directory Number | Billing Number | Feature 1 | ... | Feature N | SCN ID |
|---|---|---|---|---|---|---|
| 165 | 979-8888 | 979-8888 | X | | | 0 |
| 78 | 979-1234 | 979-1234 | | | X | 2 |
| 218 | 979-1468 | 979-5555 | X | | X | 3 |
| 129 | 979-7531 | 979-7531 | X | | | 4 |

Each tuple or row in Table 1 contains information relating to a port (communication line connection point) supported by a switch module. The illustrative information includes the number of the corresponding port supported, the directory number (telephone number) assigned to the port, and a billing number which determines where service charges are to be billed for services rendered for the corresponding directory number. Each tuple also includes a plurality of feature fields illustrated as Features 1-N in Table 1. The features represent customer selectable services supported by the central office switch with the "X's" representing flags in the corresponding feature columns identifying whether or not the customer associated with the directory number has subscribed to the feature. The last column in Table 1 contains data corresponding to a service circuit node identification number (SCN ID) which is utilized as an index to locate additional information in Table 2. In the illustrative embodiment of the present invention, a zero "0" in the SCN ID column of Table 1 is a flag representing that no corresponding entry exists in Table 2; this indicates that SCN provided preconnection services in accordance with the present invention are not subscribed to by the corresponding subscriber. Other numbers or data in the SCN ID column of Table 1 indicate that the corresponding subscribers have subscribed to additional services in accordance with the present invention and require additional processing utilizing Table 2.

With regard to port 165, the data in Table 1 indicates that: the directory number is also utilized as the billing number; Feature 1 is subscribed to; Feature N is not subscribed to; and no preconnection SCN services are subscribed to as indicated by the zero in the SCN ID column. For port 218, the billing number is not the same as the corresponding directory number, Features 1 and N are subscribed to, and preconnection services are subscribed to as indicated by the "3", i.e. nonzero, in the SCN ID column. It will be understood that only a few representative examples of subscribers are illustrated in Table 1.

Table 2 illustrates are exemplary database in accordance with the present invention which is preferably stored in memory of each switch module. The data in the SCN ID column of Table 1 function as an index to identify a tuple with corresponding data in the SCN ID column of Table 2. It will be understood that subscribers, as represented by tuples in Table 1, may elect the same type of preconnection services to be rendered by the SCN and hence, will utilize the same SCN ID numbers. Thus, Table 2 need only contain a sufficient number of tuples to correspond with the number of different SCN ID data utilized in Table 1. Table 2 will have a substantially fewer number of tuples as compared with Table 1. Thus, the database represented by Table 2 minimizes the quantity of stored data required as compared to a switch which uses only a single database (table) in which all the data is stored.

TABLE 2

| SCN ID | FWD #1 | Billing #1 | FWD #2 | Billing #2 | ... | FWD Select # | Service |
|---|---|---|---|---|---|---|---|
| 2 | 713-2344 | 713-2300 | 224-6665 | 224-6600 | ... | 1(2) | ON |
| 3 | 713-2345 | 713-2300 | 224-6666 | 224-6600 | | 2 | ON |
| 4 | 713-2346 | 713-2300 | 224-6667 | 224-6600 | | 1 | ON(OFF) |

Table 2 contains tuples associated with each different SCN D number referenced in Table 1. The corresponding data contained in columns of Table 2 contain a forwarding directory number (FWD #1) and a corresponding billing directory number (Billing #1). Additional forwarding and billing numbers may also be provided as indicated. A forwarding select number (FWD SELECT #) column contains data which is utilized to select one of the sets of forwarding and billing numbers. The "Service" column contains an ON or OFF flag which determines whether a corresponding assurance of service feature, which will be described below, is enabled. Entries in parentheses in a call represent changes made to the data in the call as will be explained with regard to example 3 below.

In the illustrative embodiment, making the determination if preconnection services are to be provided comprises locating the corresponding tuple in the database represented by Table 1 and determining if the SCN D column contains other than a zero. The specific SCN to provide services is identified in accordance with the tuple of the database represented by Table 2 identified by the corresponding SCN ID data determined from Table 1 and in accordance with the Forward Select # column of Table 2. The directory and billing numbers of the selected SCN are thus determined by the Forward and Billing numbers in Table 2. The determination of whether the call request is from the selected SCN comprises a comparison of the billing number of the calling party and the billing number associated with the selected service circuit node as identified in Table 2.

It is believed that the embodiment of the present invention will be more readily understood if described by an illustrative example. In the following examples SCN 38 and 40 have forwarding and billing numbers as defined by #1 and #2, respectively, in Table 2. It will be understood that multihunt group capability allows each SCN to be assigned a plurality of directory numbers. Also, CPE 32, 34, and 36 are associated with port numbers 78, 218, and 129, respectively, as indicated in Table 1.

In the first example, a subscriber using CPE 26 places a call to the subscriber associated with CPE 34 by dialing directory number 979-1468. The call request is routed from switch module 18 via communication module 16 to switch module 24. Information transmitted with the calling party's call request includes the calling party's directory number and billing number. On receiving the call request, switch module 24 consults the database as represented by Table 1 and identifies the tuple associated with the called party directory number (port number 218). Since the corresponding SCN ID field contains a nonzero entry, i.e. "3", the call is not directly routed to CPE 34 but rather, further inquiry is made of the database represented by Table 2.

The corresponding SCN ID number 3 is located in Table 2. The Forward Select # entry of 2 indicates that preconnection SCN services are to be provided by SCN 40 identified by forwarding and billing #2. Next, the billing number of the calling party (CPE 26) is compared with the billing number of the selected SCN (224-6600). Since the billing numbers are not the same, the call request is forwarded from switch module 24 to SCN 40. It will be apparent to those skilled in the art that the billing numbers represent only one example of a call attribute that could form the basis for such a comparison.

SCN 40 then provides a service on behalf of the called party CPE 34. This service may comprise a variety of features as offered by the operator of the service circuit node. In this illustrative example, it will be assumed that the service provided by the service circuit node consists of selective call acceptance wherein, for each subscriber, a list of telephone numbers are stored corresponding to calling party directory numbers which are to be accepted by the subscriber. Numbers of CPE which are not on the acceptable list for the called party may receive various treatment such as routing the calling party to an answering service or playing a predetermined message. In this example, it is assumed that the calling party's number is on the acceptance list as determined by SCN 40. Upon making the acceptance determination, SCN 40 originates a call to CPE 34 by switch module 24 by calling directory number 979-1468. Switch module 24 treats the received call request from SCN 40 as any other call request and thus determines that additional services are to be provided, as indicated by the 3 in the SCN ID, and continues processing with regard to database Table 2.

Upon entering Table 2 at the tuple identified with SCN of 3, and selecting forwarding and billing #2, as indicated by the 2 in the Forward Select # column, a comparison of the billing numbers is again made. The call request placed by SCN 40 contains the directory and billing number of SCN 40. Thus, the comparison of the billing number 224-6600 of the calling party (SCN 40) to the billing #2 of Table 2 results in a TRUE comparison. Because the comparison is TRUE, the call request from SCN 40 is processed and connection established with CPE 34. In this example, the call request from CPE 26 which was forwarded to SCN 40 is now joined with the call made from SCN 40 to CPE 34 and the SCN 40 terminates its services. It should be noted that the same call processing is applied regardless of whether the calling party is served by switch 10 or another switch which is part of the PSTN as shown in FIG. 1.

In a second example, a subscriber associated with CPE 26 initiates a call to the subscriber associated with CPE 36. Upon switch module 24 receiving the call request and locating the tuple in Table 1 corresponding to directory number 979-7531 of CPE 36, preconnection processing is indicated by the 4 of the SCN ID column. In this example forwarding and billing #1 are selected, as indicated by the 1 in the FWD Select # column of Table 2 which is associated with the tuple of SCN ID of 4. Since the billing number of the calling party does not match billing #1 (713-2300), the call request is forwarded to SCN 38 which is associated with directory number 713-2346. In this example SCN 38 contains a database listing all directory numbers associated with central office switch 10 and the corresponding names of the subscribers. SCN 38 searches the database, locates the directory number of the calling party and associates a stored name.

The SCN 38 places a call request to the directory number associated with CPE 36 via switch module 24. This call request is again routed from Table 1 to Table 2 to the tuple having the corresponding SCN ID of 4. Since SCN 38 has a billing number of 713-2300 a comparison of the calling party billing number with the billing number in the Billing #1 of Table 2 results in a TRUE comparison. Since the comparison of billing numbers is TRUE, the call request from SCN 38 is processed and the call made to the subscriber of CPE 36.

Upon the subscriber answering, an audible announcement is made by SCN 38 of the identity of the calling party in accordance with the data table stored in SCN 38. A text-to-speech converter is employed to provide an audible announcement of the name of the calling party. The subscriber of CPE 36, upon generating a predetermined touch-tone command, can indicate acceptance of the call or indicate nonacceptance of the call, such as by hanging up. If the call is to be accepted, the originating call request from CPE 26 is merged with the existing call between SCN 38 and CPE 36, and SCN 38 thereafter exits the connection, leaving subscribers of CPE 26 and 36 in communication. If the call is not accepted, SCN 38 follows a predetermined nonacceptance procedure such as by providing an audible announcement to subscriber 26 and thereafter terminating the call request from CPE 26.

In third and fourth examples, a subscriber receiving services in accordance with the present invention is called by another subscriber. However, in these examples SCN 38 is not in service. The illustrative Service feature provides two different treatments of calls when the original SCN designated by Table 2 is unavailable to handle the call, e.g. when SCN 38 is out of service. In the third example, incoming call requests are routed by Table 2 directly to the called party subscriber. In the fourth example, call requests are routed by Table 2 to an alternate SCN which is in service. The Administration Module will have determined the out-of-service condition of an SCN, e.g. SCN 38. Upon making this determination, Table 2 is updated to effectuate the two call treatments by changing the data in the cells of Table 2 having data in parentheses. In the third and fourth examples, the data is changed to the data shown in parentheses, i.e. the data of the cell identified by the FWD Select # column and SCN ID 2 row is changed from 1 to 2 and the data of the cell identified by the Service column and SCN ID 4 is changed from ON to OFF.

In the third example, a call request from CPE 26 for CPE 36 is routed to SCN ID 4 of Table 2. The corresponding Service column data is now OFF to indicate that call requests should not be routed to any SCN's for further services. When the Service column is OFF, the call request is directly routed to CPE 36 to assure that the called subscriber does not lose service, should the preconnection service provided by the SCN be unavailable. Thus, the call request from CPE 26 will be routed to CPE 36 without a comparison of billing numbers, thereby bypassing the out-of-service SCN 38.

In the fourth example, CPE 26 originates a call to the subscriber associated with CPE 32. This call request is routed to Table 2 with the tuple of SCN ID 2 in accordance with Table 1. Since the corresponding Service column in Table 2 is ON, the FWD Select # is checked to determine which FWD # and Billing # set to use. The FWD # determines which SCN to use. The FWD Select # has been changed from 1 to 2 so that SCN 40 associated with the FWD #2 will be used instead of the out-of-service SCN 38 which is associated with FWD #1. Thus, this call request is routed to SCN 40 for processing. The remainder of the processing steps proceeds as previously explained for the first example. It will be noted that SCN 40 may have processing capabilities that duplicate SCN 38 for those subscribers that have elected services corresponding to SCN ID 2 in order to permit SCN redirection by the FWD Select # column.

Upon the SCN 38 returning to service, the Administration Module 12 will change the data in Table 2 back to the initial data, i.e., the data of the cell of column FWD Select # and SCN ID 2 row from 2 to 1 and the data of the cell of column Service and SCN ID 4 from OFF to ON. Thus, call processing is restored to the "normal" condition where SCN 38 returns to service.

The illustrative embodiment of the present invention facilitates the providing of preconnection services to a called party such as without requiting multiple directory numbers to be assigned to the called party. Upon receiving a call request, a determination is made if preconnection services are to be provided for the called party. If such preconnection services are to be provided, the service node to provide the services is identified and a determination is made if the call request is from other than the identified service node. If the call request is not from the service node, the call request is routed to the service node for preconnection services. If a call request is from the selected service node, the associated call is routed to the called party, thereby permitting the service node to establish communications with the called party subscriber while the original calling party's call request can be held in abeyance pending the rendering of services by the selected service node. Depending on the result of the services, the original calling party can then be connected to the called party. Although the SCN call to the original called party was triggered by the call request from the original calling party in the illustrated examples, other events could cause the SCN to initiate a call to a subscriber.

Although an illustrative embodiment of the present invention has been described and shown in the drawings, the scope of the present invention is defined by the claims which follow.

We claim:

1. A method for providing preconnection services in a telecommunication system prior to a call from a calling (CG) party being offered to a called (CD) party, the system including a central office switch to which the CD party is connected and at least one service node coupled to the switch, the method implemented by the switch comprising the steps of:

receiving a call request for a CD party having a predetermined directory number;

determining if said preconnection services are to be provided for said call request;

if said preconnection services are to be provided, identifying one service node to provide said preconnection services;

determining if said call request is from said one service node, said step of determining if said call request is from said one service node comprising the steps of locating a record in a services database associated with said switch connected to the CD party, comparing a predetermined call attribute provided as part of said call request with a corresponding call attribute stored as part of said record, and determining if said call request is not from said one service node based on said comparison;

if said call request is not from said one service node, routing the call request to said one service node where said preconnection services are performed;

if said call request is from said one service node, routing the call request to said CD party having said predetermined directory number, thereby facilitating preconnection services prior to completion of said call request to the CD party.

2. The method according to claim 1 wherein said step of determining if preconnection services are to be provided for said call request comprises the steps of locating a first record corresponding to the CD party in a customer database associated with said switch and making said preconnection service determination based on data stored in a predetermined field of said first record.

3. The method according to claim 2 wherein said step of identifying said one service node comprises the steps of locating a second record corresponding to the CD party in a services database associated with said switch and identifying said one service node based on service node data stored in a field of said second record.

4. The method according to claim 1 wherein said comparing step compares a billing number assigned to a party making the call request with a billing number assigned to said one service node, an equality resulting from the comparison indicating that said one service node is the CG party.

5. The method according to claim 1 wherein said predetermined number is utilized by said CG party and by said one service node to originate calls to said CD party.

6. The method according to claim 1 further comprising the steps of determining if said one service node is available for service, and if said one service node is not available for service, routing said call request to said CD party thereby not routing said call request to any service nodes for preconnection services.

7. The method according to claim 6 further comprising the step of changing data in a field of a record that indicates whether said one service node is to provide the preconnection services upon said determination that said one service node is not available for service so that said call request is not attempted to be routed to any service nodes.

8. The method according to claim 1 wherein said step of determining is said preconnection services are to be provided for said call request comprises said preconnection services being selectable by the CD party.

9. A telecommunication switch that facilitates preconnection services in a telecommunication system prior to a call from a calling (CG) party being offered to a called (CD) party, the system including at least one service node coupled to the switch, the switch comprising:

means for receiving a call request for said CD party having a predetermined directory number;

means for determining if said preconnection services are to be provided for said call request;

means for identifying one service node to provide said preconnection services if preconnection services are to be provided;

means for determining if said call request is from said one service node, said means for determining if said call request is from said one service node comprising means for locating a record in a services database associated with said switch connected to the CD party, means for comparing a predetermined call attribute provided as part of said call request with a corresponding call attribute stored as part of said record, and means for determining if said call request is not from said one service node based on the results of said comparison;

means for routing the call request to said one service node where said preconnection services are performed if said call request is not from said one service node;

means for routing the call request to said CD party having said predetermined directory number if said call request is from said one service node, thereby facilitating said preconnection services prior to completion of said call request to the CD party.

10. The switch according to claim 9 wherein said means for determining if preconnection services are to be provided for said call request comprises means for locating a first record corresponding to the CD party in a customer database associated with said switch and means for comparing data stored in a predetermined field of said first record with a predetermined value, said preconnection service determination based on said comparison.

11. The switch according to claim 10 wherein said means for identifying said one service node comprises means for locating a second record corresponding to the CD party in a services database associated with said switch, and means for identifying said one service node based on service node data stored in a field of said second record.

12. The switch according to claim 9 wherein said comparing means compares a billing number assigned to a party making the call request with a billing number assigned to said one service node, an equality resulting from the comparison indicating that said one service node is the CG party.

13. The switch according to claim 9 wherein said predetermined number is utilized by said CG party and by said one service node to originate calls to said CD party.

14. The switch according to claim 9 further comprising means for determining if said one service node is available for service, and means for routing said call request to an alternate service node for preconnection services if said one service node is not available for service.

15. The switch according to claim 14 further comprising means for changing data in a field of a record that indicates which service node is to provide the preconnection services upon said determination that said one service node is not available for service.

16. The switch according to claim 9 further comprising means for determining if said one service node is available for service and means for routing said call request to said CD party if said one service node is not available for service, thereby not routing said call request to any service nodes for preconnection services.

17. The switch according to claim 16 further comprising means for changing data in a field of a record that indicates whether said one service node is to provide the preconnection services, to different data that prohibits the routing of said call request to any service nodes upon said determination that said one service node is not available for service, wherein said call request is not attempted to be routed to any of said service nodes.

18. The switch according to claim 9 wherein said determining means determines if said preconnection services are to be provided for said call request where said preconnection services are selectable by the CD party.

* * * * *